Dec. 17, 1968 C. R. ATZENBECK 3,417,333

ERROR CORRECTOR FOR DIPHASE MODULATION RECEIVER

Filed June 22, 1965 2 Sheets-Sheet 1

INVENTOR.
CHARLES R. ATZENBECK
BY
Edward J. Norton
Attorney

ERROR CORRECTOR FOR DIPHASE MODULATION RECEIVER

Filed June 22, 1965 2 Sheets-Sheet 2

INVENTOR.
CHARLES R. ATZENBECK
BY
Edward J. Norton
Attorney

United States Patent Office 3,417,333

Patented Dec. 17, 1968

3,417,333

ERROR CORRECTOR FOR DIPHASE MODULATION RECEIVER

Charles R. Atzenbeck, Cranford, N.J., assignor to Radio Corporation of America, a corporation of Delaware Filed June 22, 1965, Ser. No. 465,906
8 Claims. (Cl. 325—320)

ABSTRACT OF THE DISCLOSURE

In a diphase communication system, a cycle, occurring in a bit interval, is reversed in phase at the middle thereof to indicate a mark, and another cycle, also occurring in a bit interval, continues without phase reversal to indicate a space. In such a system, in the absence of mutilation during transmission, the last half of one cycle (the last half of one bit interval) and the first half of the next cycle (the first half of the next bit interval) must be of opposite polarity. If they are of the same polarity, a high probability of error exists. It is assumed that the smaller in magnitude of the two half cycles of the same polarity that should be of opposite polarity is in error. Means are provided to detect the probable error by noting the occurrence of two half cycles of the same polarity that should be of opposite polarity and to reverse the polarity of the one of these two half cycles that is smaller in magnitude, whereby the received message is corrected.

This invention relates to apparatus for correcting at a receiver errors introduced during the transmission of a diphase modulated signal.

A diphase modulated signal wave has been defined as a carrier wave with a frequency equal to the bit transmission rate whose phase is reversed, or not reversed, in response to coded data in the form of a mark or space signal input, respectively. The phase reversal takes place at the time the carrier wave would otherwise pass through its zero reference axis. As will be shown, such a diphase modulated signal, when free of errors, must reverse its polarity at intervals of a full cycle of the carrier wave; that is, at bit intervals, whereby absence of a polarity reversal between bit intervals indicates signal mutilation and high probability of error. For example, if the polarity of the last half of a bit interval of a received signal is the same as the polarity of the first half of the next consecutive bit interval, a mutilation of the received signal is evident and the probability of error is high.

Situations can arise where, due to reversal of the polarity of both halves of the bit interval, consecutive pulses that bridge consecutive bit intervals may be of the same polarity and yet, the bit, though mutilated, is not in error. Such situations are rare. The herein described system considers any received signal to be in error where consecutive pulses bridging consecutive bit intervals are of the same polarity. The mutilation of the received diphase signal can be due to static or to other electrical disturbances during transmission of the signal. Apparatus for determining the polarity of adjacent half cycles occurring in consecutive bit intervals of a received diphase modulated signal can be used to detect the presence of a mutilated signal at the receiver, and the high probability of an error. However, such apparatus cannot in itself determine which polarity is incorrect, and therefore cannot in itself correct such mutilations.

It is an object of this invention to provide improved apparatus for correcting errors detected upon the reception of a phase modulated data signal.

It is another object of this invention to provide such error correcting apparatus that requires no special coding of the transmitted signal and that requires no parity conditions or special format of the input signal to the transmitter modulator.

Another object of this invention is to provide such error correcting apparatus requiring no modification in the transmitter.

Still another object of this invention is to provide such error correcting apparatus requiring no increases in the transmission band width or decrease in rate of bit transmission.

In a receiver in which this invention can be included, means are provided to compare the polarity of the last half of a received signal received during a bit interval with the first half of the received signal received in the next consecutive bit interval. When these two polarities are the same, a high probability of the occurrence of an error in the received signal is indicated. In accordance with the invention, the amplitude of the two consecutive half cycles appearing in different adjacent bit intervals and having the same polarity are compared, and the half cycle which is greater in amplitude is assumed to have the correct polarity. The polarity of the smaller half cycle is then reversed. While the half cycle of greater amplitude is not always of the correct polarity, the half cycle of greater amplitude is of the correct polarity more often than the smaller. Similarly, while the occurrence of the same polarity of the last half of a bit interval and the first half of the next consecutive bit interval does not always indicate an error, this condition indicates an error more often that it does not. The result is that the number of errors in the transmission is reduced.

The novel feaures of the invention both as to its organization and method of operation, as well as additional objects and advantages thereof, will be understood more readily from the following description when read in conjunction with the accompanying drawing, in which.

Figure 1:
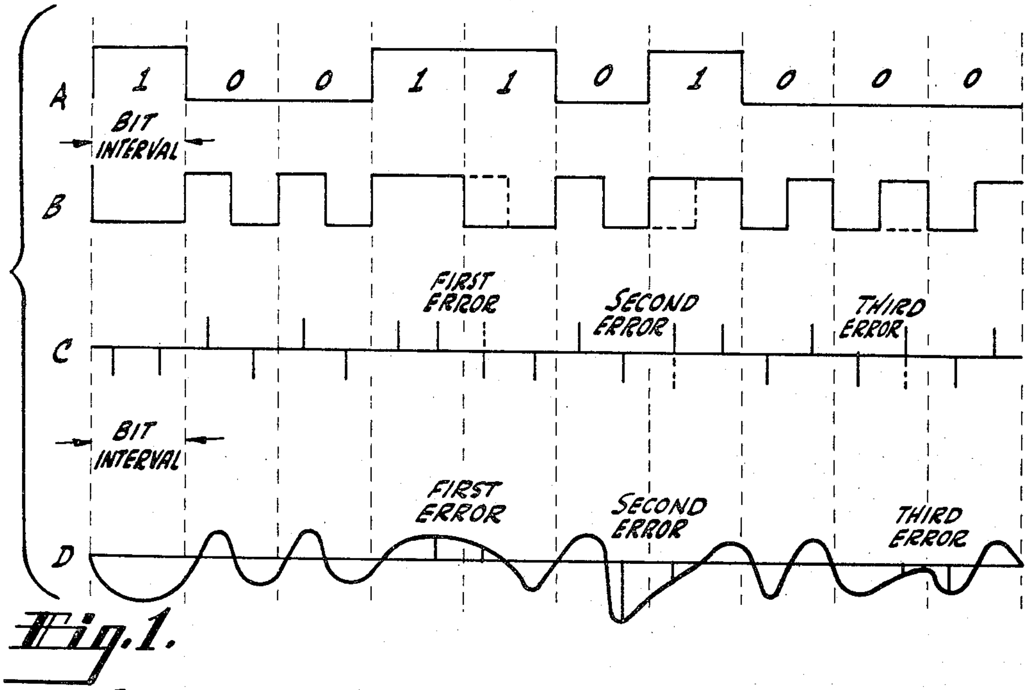
FIGS. 1 and 3 are waveforms useful in explaining this invention.

Information to be transmitted may advantageously be in the form of marks (1) and lack of marks or spaces (0). As indicated in the curve A of FIG. 1, a high level of voltage during a signal interval can indicate a mark, and a low level of voltage during a signal interval can indicate a space. The curve A of FIG. 1 therefore comprises the information MSSMMSMSS or 100110100. The solid portion of the curve B of FIG. 1 represents a diphase modulated signal carrying the same information. In response to the occurrence of a mark (1) during a bit interval which comprises one cycle of a wave to be transmitted, the wave of curve B is reversed in phase in the middle of a cycle thereof. However, in response to the occurrence of a space (0), the curve B continues its phase, whether previously reversed to indicate a (1) or mark or unreversed to indicate a space or (0), for the remainder of the cycle without further phase reversal. Neglecting for the moment the dotted portion of the curve B, it will be noted that if the wave represented by the curve B is sampled at a rate equal to twice the carrier (or bit) frequency of this wave, as shown by the solid portion of curve C of FIG. 1, two pulses of the same polarity appear during a bit interval to indicate the presence of a mark, and two pulses of the opposite polarity appear during a bit interval to indicate the presence of a space. It will also be noted that in all instances (for an unmutilated wave), the polarity of a pulse in the last half of any bit interval and the first half of the next consecutive bit interval are always of opposite polarities.

Figure 2:
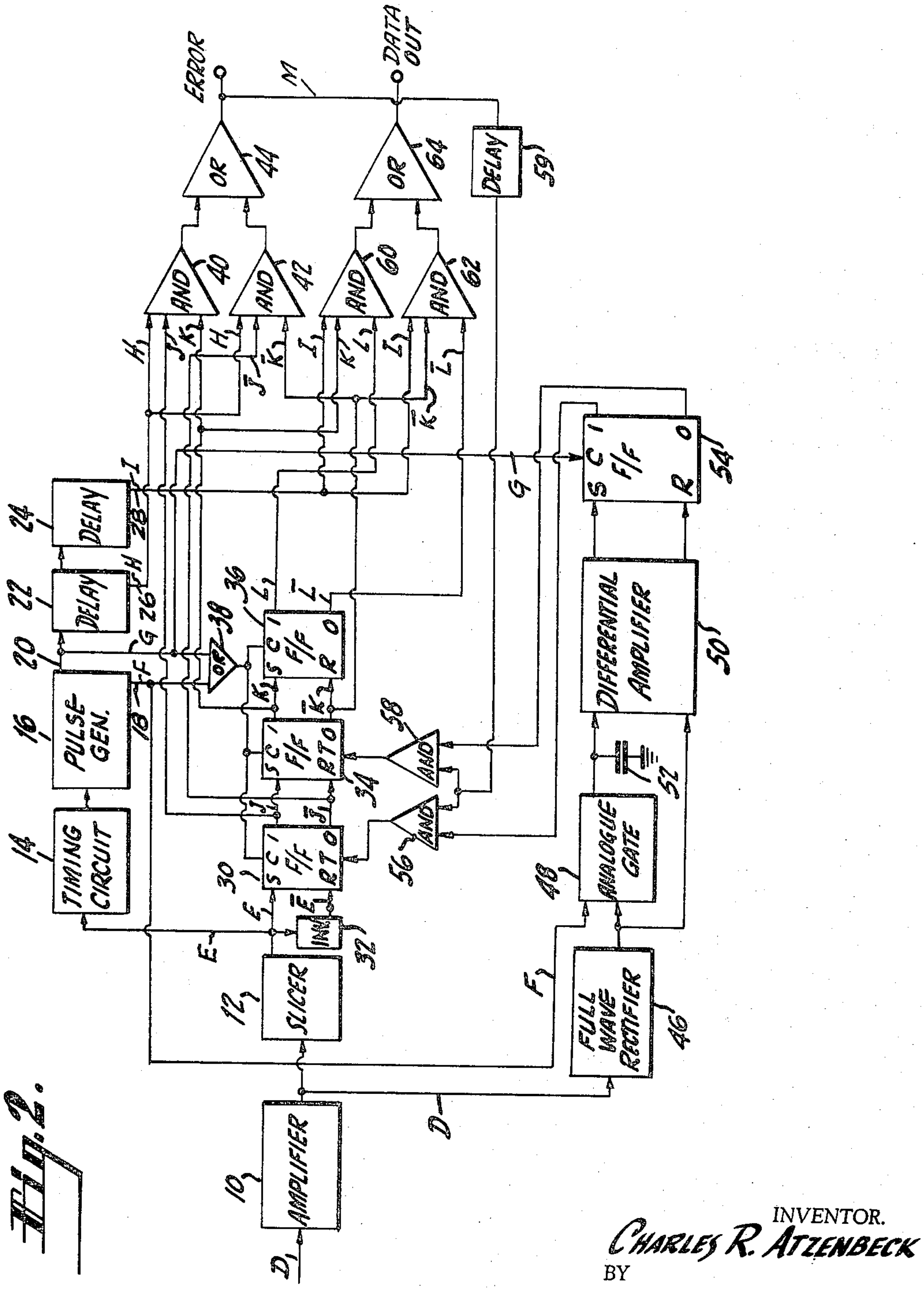
FIG. 2 is a block diagram of a receiver for a diphase modulated signal including one embodiment of an error correcting apparatus of this invention.

Let it be assumed that during transmission of the wave of curve B to the receiver of FIG. 2, the received wave is distorted as by static or other electrical disturbances so that portions thereof take the dotted shape of curve B rather than the solid shape. Then, as indicated by the dotted portions of curve C, the pulses provided by sampling the distorted wave exhibit the same polarity at each side of the boundary between consecutive bit intervals, indicating a mutilation and the high probability of an error in the transmission. It will be noted that three consecutive pulses of the same polarity appear in curve C at the part thereof marked First Error. While the occurrence of three consecutive pulses of the same polarity indicates an error since, as noted above, an undistorted wave cannot produce more than two consecutive pulses of the same polarity, an error may occur even though three consecutive pulses of the same polarity are not received. For example, at the Second Error in line C, only two consecutive pulses of this same polarity appear. The presence of two consecutive pulses of the same polarity bridging the boundary between consecutive bit intervals very often indicates an error in the reception even in such cases where three consecutive pulses of the same polarity do not appear. By definition of a diphase modulated signal, one of these two consecutive pulses has the correct polarity. However, there is no certain indication which of the two pulses of the same polarity bridging the boundary between two consecutive bit intervals is of the correct polarity.

Although the diphase modulated signal as applied to the transmission medium may have the square shape of curve B, the wave as received, due to various reactances in the transmission line or in the receiver will have rounded corners as shown by curve D of FIG. 1. It is assumed that due to static or other sources of distortion, portions of the received wave are distorted whereby the polarity sampling device, comprising part of the receiver to be described, indicates the presence of two pulses of the same polarity bridging a boundary between consecutive bit intervals at each of the three errors indicated in the received wave D. Also as indicated in the Curve D, experience has shown that the pulse of incorrect polarity is usually smaller in amplitude than the pulse of correct amplitude. FIG. 2 shows in block diagram form, a receiver circuit for correcting such errors. Before an error can be corrected, it must be detected. The error detector portion of FIG. 2 will be described first in connection with the curves of FIG. 3.

Figure 3:
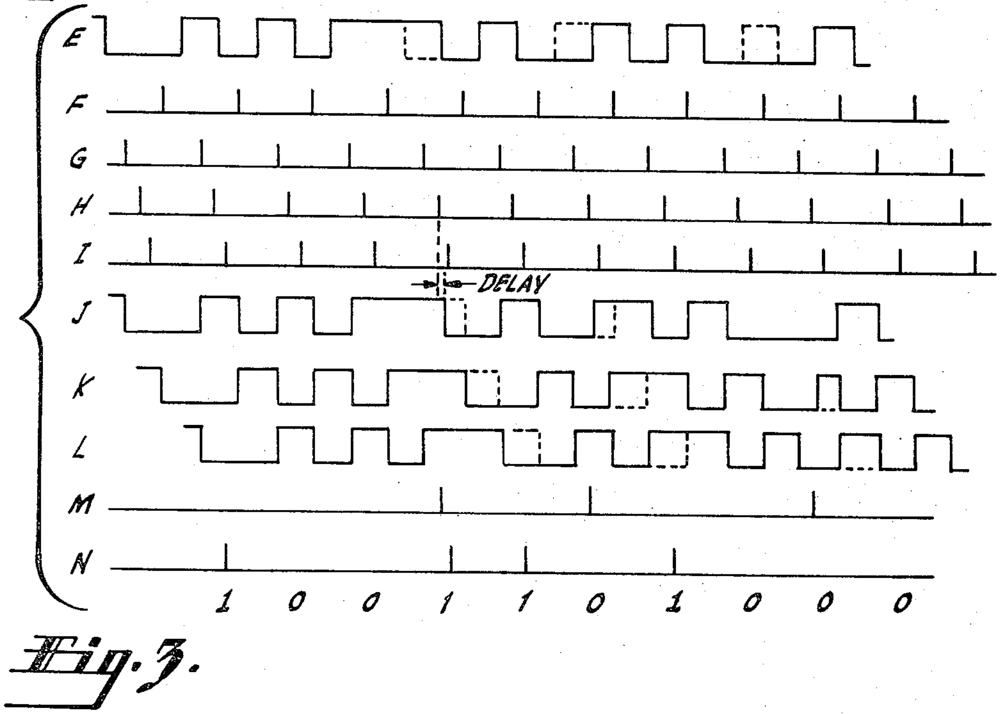

A wave which may take the shape of Curve D, FIG. 1, after transmission over a suitable transmission path, not shown, is applied to the input terminals of an amplifier 10 included in the receiver of FIG. 2. The signal D is the transmitted diphase modulated signal with the three errors therein as indicated, after the square corners of the transmitted waves have been rounded off, either by the distributed reactances of the transmission medium, or by passing through an input filter (not shown) that may be a part of the receiver. The amplifier 10 merely amplifies the signal and the output thereof, which is merely an amplified replica of the signal D of FIG. 1, is applied to a slicer 12. The output of the slicer 12 is the solid line portion of the curve E of FIG. 3. The solid line portion includes the three errors found in the received signal D. The dotted portion of the curve E which indicates the demodulated wave if it were transmitted without errors, is added for explanation purposes. The signal E of FIG. 3 is applied to a timing circuit 14 and the output of the timing circuit 14 is applied to a pulse generator 16 which provides a series of alternate pulses from its two outputs 18 and 20 shown at curves F and G of FIG. 3, the alternate pulses F and G being equally spaced in time from each other. A pulse appears at both outputs 18 and 20 of the generator 16 during each bit interval of the transmitted wave. The output 20 of the pulse generator 16 is fed to two delay circuits 22 and 24 in tandem. The output pulses of the two delay circuits 22 and 24, as shown respectively in curves H and I of FIG. 3, appear at the respective output terminals 26 and 28 of the delay circuits 22 and 24. The pulses H and I are spaced from each other and appear between a pulse of curve G and a pulse of curve F. The intervals between the G and H pulses, between the H and I pulses, and between the I and F pulses can all be equal.

The output of the slicer 12 is fed directly to the set (S) input of the flip-flop circuit 30 and to the reset (R) input terminal of the flip-flop circuit 30 through an inverter 32, whereby opposite phase versions of the signal of curve E of FIG. 3 are applied respectively to the two inputs S and R of the flip-flop 30. The flip-flop circuit 30, which also has a C input and a One and a Zero output terminal operates as follows. Whenever a pulse of proper polarity is applied to the S and also to the C inputs concurrently, then a positive voltage level appears on the One output terminal thereof and the flip-flop 30 is said to be in the "One" state. Whenever a pulse is applied to the R input and also to the C input concurrently, a positive voltage level appears at the Zero output terminal of the flip-flop 30 and the flip-flop 30 is said to be in the "Zero" state. The flip-flop 30 can be in only one of the two states. Also, the state of the flip-flop 30 is not changed, if it is in the One state, until both a reset and a timing pulse are applied concurrently to the flip-flop 30. Similarly the state of the flip-flop is not changed, if it is in the Zero state, unless a set and a timing pulse are applied concurrently to the flip-flop 30. A plurality of similar additional circuits 34 and 36 are provided, and the One and Zero output terminals of the successive flip-flops 30, 34 and 36, except the last, are connected respectively to the S and R inputs of the next flip-flop. In addition, flip-flops 30 and 34 have a toggle input T. No toggle input T is used with the flip-flop 36. When a pulse of proper polarity is applied to the T input of flip-flops 30 or 34, the state of flip-flop 30 or 34 will change; for example if the flip-flop is in the Zero or One state and a pulse is applied to the T input, the flip-flop will switch over to the One or Zero state. The operation due to application of pulses to the T input will occur independently of any signals present at the set and reset inputs. As will be noted, the C and the T inputs will not be pulsed simultaneously.

Both series of timing pulses F and G from the pulse generator 16 are applied to an Or circuit 38 and the output of the Or circuit 38 is applied to the C inputs of the several flip-flops 30, 34 and 36, whereby all timing pulses F and G provided by the generator 16 are applied to the C inputs of all the flip-flop circuits 30, 34 and 36. Therefore, in a known manner, waveforms as shown in curves J, K and L of FIG. 3 appear respectively at the One output terminals of the several flip-flop circuits 30, 34 and 36, and the corresponding opposite polarity waves $\overline{J}$, $\overline{K}$ and $\overline{L}$ (not shown) appear respectively at the Zero output terminals of the flip-flop circuits 30, 34 and 36. In the absence of a correction pulse as noted below, each of the waves J, K and L is a replica of the output of the slicer 12. The wave J is delayed about a quarter of a bit interval with respect to the output of the slicer 12. The amount of this delay is unimportant. The waves K and L are each delayed a half a bit interval in the flip-flop circuit 34 and 36 by the operation thereof.

As noted above, an error can be detected by comparing the polarity of the half bits of the received wave that bridge a bit interval. The And circuits 40 and 42 and the Or circuit 44 indicate the presence of an error as will be explained below.

The One output J of the first flip-flop circuit 30 is applied to one of the three input terminals of the And circuit 40, and the One output K of the second flip-flop circuit 34 is applied to a second input of the And circuit 40. The Zero output $\overline{J}$ of the first flip-flop circuit 30 is applied to one of the three terminals of the And circuit 42, while the Zero output $\overline{K}$ of the second flip-flop 34 is applied to a second input terminal of the And circuit 42. The timing pulses H from the first delay circuit 22 are applied to a third input terminal of both the And circuits 40 and 42. The outputs of the And circuits 40 and 42 are applied to the Or circuit 44. The And circuits 40 and 42 check for the same polarity of the wave included in the last half and the first half of consecutive bit intervals. Each And circuit 40 and 42 is adjusted to give an output only when the waves applied to its first and second input terminals are positive at the time that the timing pulse H is applied thereto. As may be noted by comparing curves J and K of FIG. 3, the wave occurring during the last half of one bit interval and the first half of the next bit interval appear on the first two terminals of the And circuit 40 at the time of the timing pulse H. If the polarity of both of these two waves is positive at that instant, the And circuit 40 provides an output that indicates an error. The first error pulse of curve M, FIG. 3, is provided by the And circuit 40. Waves $\overline{J}$ and $\overline{K}$ (not shown), which are 180° out of phase with the waves J and K applied to the And circuit 40, are applied to the other And circuit 42. If both of the inputs of the And circuit 42 are positive when the timing pulse H is applied thereto, the And circuit 42 provides an output that indicates an error. The second and third error pulses of curve M, FIG. 3, are produced by the And circuit 42. The Or circuit 44, which provides an output for either input applied thereto, adds the outputs of the two And circuits 40 and 42, and provides a pulse in its output each time the last half of a wave in a bit interval is of the same polarity as that of the wave in the first half, as shown in curve M of FIG. 3. Upon indication of an error, that is upon indication that two consecutive pulses obtained by sampling the described wave are of the same polarity when they should be of opposite polarities, it is assumed that the larger of the two pulses of the same polarity is of the correct polarity and correction of the received signal is affected accordingly.

First, in the correction of detected errors, the two pulses, one of which is incorrect, are compared to determine which is greater in amplitude. The received wave D, FIG. 1, after amplification in the amplifier 10, but before squaring in the slicer 12, exhibits differences in amplitude of its several peaks, as suggested in curve D of FIG. 1. This wave is applied to a full-wave rectifier 46. The full-wave rectified wave from the rectifier 46 is applied to one input of an analogue gate 48 and also to one input of a differential amplifier 50. The timing pulses of curve F of FIG. 3 are applied to the analogue gate 48 whereby the analogue wave in the gate is sampled during the last half of a bit interval. This portion of the wave sampled by the analogue gate 48 appears across the output of the analogue gate 48 and is applied to a storage capacitor 52. The capacitor 52 is also connected to the other input of the differential amplifier 50. This sampled portion, stored in capacitor 52, is compared with the next occurring peak in the differential amplifier 50. The two outputs of the differential amplifier 50 are applied respectively to the set S and reset R inputs of an additional flip-flop circuit 54 which operates similarly to the flip-flop circuit 36 above described. The timing wave of curve G of FIG. 3 is applied to the C input of the flip-flop circuit 54. The operation of the flip-flop 54 is such that when the next peak in the received rectified signal is greater than the sampled peak, the Zero output of the flip-flop circuit 54 is positive. When the sampled peak of the received rectified signal is greater than the next peak, the One output of the flip-flop 54 is positive. The One and Zero outputs of the flip-flop 54 are applied respectively to one of the two inputs of additional And circuits 56 and 58. The error voltage as shown in curve M appearing at the output of the Or circuit 44 is applied to the other input terminal of each of the And circuits 56 and 58 through a delay circuit 59. The delay provided by the delay circuit 59 is at least as wide as a pulse H and shorter than the time between pulses H and I, as indicated at curve J of FIG. 3. The purpose of this delay is to prevent so called "race" problems as by permitting the several flip-flops to complete their transitions before the correction pulse is applied. The output of the And gate 56 is applied to the toggle input T of the first flip-flop 30. The output of the And gate 58 is applied to the toggle input T of the second flip-flop 34. Therefore at the occurrence of an error signal, when the sampled peak is greater than the next peak in the received signal, a positive pulse is applied to the toggle input T of the first flip-flop 30. At the occurrence of an error signal when the next peak of the received signal is greater than the previous sampled peak, a positive pulse is applied to the toggle input T of the second flip-flop 34. As will be explained below, these last mentioned pulses correct the received signal appearing in these flip-flop circuits 30, 34 and 36.

For explanation of the operations of the described error correcting circuit, reference may be had again to the curve D of FIG. 1. One of the two pulses defining the First Error indicated in curve D that bridges a bit interval must be incorrect. As noted above, it is assumed that the smaller one is incorrect. Therefore for the first error indicated, the And circuit 56 applies a pulse to the toggle input T of the first flip-flop circuit 30 causing its Zero output to become positive and its One output to become negative, which as can be seen, corrects the First Error in the received wave. For the Second Error in which the two consecutive pulses defining that error are of the same polarity with respect to each other, but of opposite polarity with respect to the first error pulses, the full-wave rectifier reverses the polarity of both pulses defining the Second Error, whereby the first peak of the Second Error is higher than the second peak of the Second Error, and the And circuit 56 again corrects the error in a similar manner. For the Third Error in curve D of FIG. 1, it may be noted that the pulse in the last half of the bit interval is smaller than the adjacent following pulse. Turning to FIG. 2, the And circuit 58 is now operated by flip-flop 54 to apply a pulse to the toggle terminal T of the second flip-flop 34, correcting this error as indicated in curve K of FIG. 3.

The information carried by the diphase modulated signal B of FIG. 1 can be reproduced after correction by comparing the polarities of the waves in the first and second halves of a bit interval. After correction, the waves shown in curves K and L are delayed replicas of the correct, solid portion of curve B of FIG. 1. Therefore the waves applied to the set input of the second flip-flop circuit 34 at the instants of occurrences of the timing pulses I, has the shape of wave J using the solid portion thereof rather than the adjacent dotted portion. The wave applied to the reset input of the flip-flop 34 is the inverse of the wave applied to the set input thereof. The waves appearing at the outputs of the flip-flops 34 and 36 at the time of the pulses I are corrected replicas or inverse replicas of wave J delayed by each flip-flop 34, 36 by one half a bit interval.

As noted above, if the polarity of the wave is the same in both halves of a bit interval, the wave during this bit interval indicates a mark or (1), and if the polarity is opposite in the two halves of a bit interval, the wave during the last mentioned bit interval indicates a space or (0). The polarity of the successive half waves of the same bit interval are compared by the And circuits 60 and 62 after correction of the wave is accomplished.

To perform this comparison, the One output K of the second flip-flop 34 is applied to one input terminal of the And circuit 60 and the Zero output $\overline{K}$ of the second flip-flop 34 is applied to one input terminal of the And circuit 62. The One output L of the third flip-flop 36 is applied to another input terminal of the And circuit 60, and the Zero output $\overline{L}$ of the third flip-flop is applied to another input terminal of the And circuit 62. The timing pulses of curve I of FIG. 3, comprising the output of the second delay circuit 24 which are subsequent to the error detecting pulses H, are also applied to the remaining ones of the three input terminals of the two And circuits 60 and 62. Therefore, the diphase modulated wave is demodulated at the occurrence of the pulses I, after the diphase modulated wave has been corrected at the occurrence of the pulses H.

The two And circuits 60 and 62 are so constructed that when the pulses applied thereto from the second and third flip-flop circuits 34 and 36, as described above, are both positive at the time that a timing pulse I is applied thereto from the second delay circuit 24, a pulse appears at the output of the And circuit 60 or 62 involved. Otherwise no output pulse is provided by that And circuit. Due to the half bit interval delay provided by the flip-flop 36, the And circuits 60 and 62 compare the polarities of the pulses found in the first and second halves of a bit interval, and provide a pulse when the polarity therein is the same to indicate a mark (1) and provide no pulse when the polarities are opposite to indicate a space (0). The Or circuit 64 to which the outputs of the And circuits 60 and 62 are connected, add together the marks and spaces in the order in which they appear at the outputs of the And circuits 60 and 62 as shown at curve N of FIG. 3, thereby reproducing the original signal 100110100 without errors. The pulse train appearing at the output of Or gate 64 can be used to reconstruct the waveform shown in curve A of FIG. 1 following known techniques, or to perform any desired operation.

Although only a single diphase error correcting circuit has been shown and described, variations thereof are possible within the spirit of the present invention. Hence it should be understood that the foregoing description is to be considered as illustrative and not in a limiting sense.

What is claimed is:

1. An error correcting circuit for a diphase modulated signal in which a wave is reversed in phase at the middle of a complete cycle thereof corresponding to one type of bit interval and in which said wave continues throughout a complete cycle corresponding to a second type of bit interval without phase reversal of the wave, whereby, in the absence of an error, the last half of a bit interval and the first half of the next adjacent bit interval are of opposite polarity comprising, means to compare the polarity of the last half of a bit interval with the polarity of the first half of the next adjacent bit interval, means responsive to the occurrence of like polarities in said adjacent half bits to provide an error signal, means to compare the amplitude of said adjacent half bit intervals of like polarity, and means responsive to the occurrence of said error signal to reverse the polarity of the smaller in amplitude of said adjacent half bit intervals of like polarity to thereby correct said error.

2. An error correcting circuit for a diphase modulated signal in which a wave is reversed in phase at the middle of a complete cycle thereof corresponding to a mark bit interval and in which said wave continues throughout a complete cycle corresponding to a space bit interval without phase reversal of the wave, whereby, in the absence of an error, the last half of a bit interval and the first half of the next adjacent bit interval are of opposite polarity comprising, means to compare the polarity of the last half of a bit interval with the polarity of the first half of the next adjacent bit interval, means responsive to the occurrence of like polarities in said adjacent half bits to provide an error signal, means to compare the amplitude of said adjacent half-bit intervals of like polarity, means responsive to the occurrence of said error signal to reverse the polarity of the smaller in amplitude of said adjacent half-bit intervals of like polarity to thereby correct said error, and means responsive to said bit intervals after correction thereof by said reversals in polarity of the half-bit intervals for comparing the polarity of the first and second halves of each bit interval to reproduce the mark and space information carried by said wave.

3. An error correcting circuit for a diphase modulated signal wave in which the wave is reversed in phase in the middle of a complete cycle of the wave which corresponds to a mark bit interval and continues throughout a complete cycle of a wave corresponding to a space bit interval without phase reversal of the wave, whereby, in the absence of an error, the last half of a bit interval and the first half of the next adjacent bit interval are of opposite polarity comprising, means responsive to said signal wave to convert said signal wave into one of constant amplitude, means for inverting said wave of constant amplitude, means for delaying said constant amplitude wave and said inverted wave for a portion of a bit interval, means for further delaying said delayed constant amplitude and inverted waves for a time equal to half of a bit interval, means for comparing the polarity of a portion of the delayed constant amplitude wave at the output of said first mentioned delaying means and corresponding to the last half of a bit interval with the polarity of a portion of the delayed constant amplitude wave at the output of said second-mentioned delaying means and corresponding to the adjacent first half of the next succeeding bit interval thereby to provide an error pulse when the last named adjacent half-bit intervals are of the same polarity, means for comparing the polarity of a portion of the delayed inverse wave at the output of said first mentioned delaying means and corresponding to the last half of a bit interval with the polarity of a portion of the delayed inverse wave at the output of said second-mentioned delaying means and corresponding to the adjacent first half of the next succeeding bit interval and thereby producing a further error pulse when the last named adjacent half-bit intervals of said inverse wave are of the same polarity, means responsive to the occurrence of said error pulses when the amplitude of the last half of a bit interval is greater than the amplitude of the first half of the next bit interval to reverse the polarity of the delayed constant amplitude and inverted waves appearing at the output of said first mentioned delaying means, and means responsive to the occurrence of an error pulse when the amplitude of the first half of a bit interval is greater than the amplitude of the last half of the previous bit interval to reverse the polarity of the delayed constant amplitude and inverted waves appearing at the output of said second mentioned delaying means, whereby errors in said signal wave are corrected.

4. An error correcting circuit for a diphase modulated signal wave in which the wave is reversed in phase in the middle of a complete cycle of the wave which corresponds to one type of bit interval and continues throughout a complete cycle of a wave corresponding to a second type of bit interval without phase reversal of the wave whereby, in the absence of an error, the last half of a bit interval and the first half of the next adjacent bit interval are of opposite polarity, comprising, means responsive to said signal wave to convert said signal wave into one of constant amplitude, means for inverting said wave of constant amplitude, means for delaying said constant amplitude wave and said inverted wave for a portion of a bit interval, means for further delaying said delayed constant amplitude and inverted waves for a time equal to half of a bit interval, means for comparing the polarity of a portion of the delayed constant amplitude wave at the output of said first-mentioned delaying means and corresponding to the last half of a bit interval with the polarity of a portion of the delayed constant amplitude wave at the output of said second-mentioned delaying means and corresponding to the adjacent first half of the next succeeding bit interval thereby to provide an error pulse when the last named adjacent half bit intervals are of the same polarity, means for comparing the polarity of a portion of the delayed inverse wave at the output of said first mentioned delaying means and corresponding to the last half of a bit interval with the polarity of a portion of the delayed inverse wave at the output of said second-mentioned delaying means and corresponding to the adjacent first half of the next succeeding bit interval and thereby producing a further error pulse when the last named adjacent half bit intervals of said inverse wave are of the same polarity, means responsive to the occurrence of said error pulses when the amplitude of the last half of a bit interval is greater than the amplitude of the first half of the next bit interval to reverse the polarity of the delayed constant amplitude and inverted waves appearing at the output of said first-mentioned delaying means, means responsive to the occurrence of said error pulses when the amplitude of the first half of a bit interval is greater than the amplitude of the last half of the previous bit interval to reverse the polarity of the delayed constant amplitude and inverted waves appearing at the output of said second-mentioned delaying means, whereby errors in said signal wave are corrected, and means responsive to said bit intervals after corrections thereof by said reversals in polarity for comparing the polarity of the first half of each bit interval with the polarity of the second half thereof to demodulate said signal wave.

5. An error correcting circuit for a diphase modulated signal wave in which the wave is reversed in phase in the middle of a complete cycle of the wave which corresponds to a mark bit interval and continues throughout a complete cycle of a wave corresponding to a space bit interval without phase reversal of the wave, whereby, in the absence of an error, the last half of a bit interval and the first half of the next adjacent bit interval are of opposite polarity, comprising means responsive to said signal wave to convert said signal wave into one of constant amplitude, means for inverting said wave of constant amplitude, means for delaying said constant amplitude wave and said inverted wave for a portion of a bit interval, means for further delaying said delayed constant amplitude and inverted waves for a time equal to half of a bit interval, means for comparing the polarity of a portion of the delayed constant amplitude wave at the output of said first-mentioned delaying means and corresponding to the last half of a bit interval with the polarity of a portion of the delayed constant amplitude wave at the output of said second-mentioned delaying means and corresponding to the adjacent first half of the next succeeding bit interval thereby to provide an error pulse when the last named adjacent half bit intervals are of the same polarity, means for comparing the polarity of a portion of the delayed inverse wave at the output of said first-mentioned delaying means and corresponding to the last half of a bit interval with the polarity of a portion of the delayed inverse wave at the output of said second-mentioned delaying means and corresponding to the adjacent first half of the next succeeding bit interval and thereby producing a further error pulse when the last named portions adjacent half bit intervals of said inverse wave are of the same polarity, means responsive to the occurrence of said error pulses when the amplitude of the last half of a bit interval in said signal wave is greater than the amplitude of the first half of the next bit interval in said signal wave to reverse the polarity of the delayed constant amplitude and inverted waves appearing at the output of said first mentioned delaying means, means responsive to the occurrence of said error pulses when the amplitude of the first half of a bit interval in said signal wave is greater than the amplitude of the last half of the previous bit interval in said signal wave to reverse the polarity of the delayed constant amplitude and inverted waves appearing at the output of said second-mentioned delaying means, whereby errors in the said signal wave are corrected, means to still further delay said constant amplitude and said inverted waves for the duration of a half of a bit interval, means to compare the polarity of the portion of the delayed constant amplitude wave appearing at the output of said second-mentioned delaying means and corresponding to the first half of a bit interval with the polarity of the portion of the delayed constant amplitude wave appearing at the output of said third-mentioned delaying means and corresponding to the other half of said last-mentioned bit interval to thereby provide a mark bit interval indication when said last named half-bit intervals exhibit like polarities and a space bit interval in the absence of said like polarity condition, means to compare the polarity of the portion of the delayed inverse wave appearing at the output of said second-mentioned delaying means and corresponding to one half of a bit interval with the polarity of the portion of the delayed inverse wave appearing at the output of said third-mentioned delaying means and corresponding to the other half of said last-mentioned bit interval to thereby provide a mark bit interval indication when said last named half-bit intervals exhibit like polarity, and a space bit interval in the absence of said like polarity condition, and means to apply said mark and space indications to an output device.

6. An error correcting circuit for a diphase modulated signal wave in which a wave is reversed in phase at the middle of a complete cycle thereof corresponding to a mark bit interval and in which said wave continues throughout a complete cycle corresponding to a space bit interval without phase reversal of the wave, whereby in the absence of an error, the last half of a bit interval and the first half of the next adjacent interval are of opposite polarity, comprising a full wave rectifier, a slicer, means for applying said signal wave after transmission to said full wave rectifier and to said slicer, a timing and pulse generating means, means for applying the output of said slicer to said timing and generating means, said timing and pulse generating means producing a first and a second series of timing pulses each at the frequency of the said diphase modulating signal wave, the timing pulses of said first series being equally spaced in time from the timing pulses of said second series, an inverter, first and second flip-flop circuits each having two stable states and a set, a reset and a timing input and a one and a zero output, means for applying the output of said slicer to the set input of said first flip-flop circuit and to the reset input of said first flip-flop circuit through said inverter, means for applying the one and the zero outputs of said first flip-flop to the set and reset inputs respectively of said second flip-flops, means for applying said first and second series of timing pulses to the timing inputs of said first and second flip-flop circuits, means responsive to the outputs of said first and second flip-flop circuits to provide an error pulse when the last half of a bit interval and the first half of the next bit interval exhibit like polarity, an analogue gate circuit having a signal and a timing input and an output, a potential storage means, a differential amplifier having two inputs and two outputs, the signal condition at the outputs of said differential amplifier indicating which input thereto is of greater amplitude, a third flip-flop circuit having two stable states and a set, a reset and a timing input and a one and a zero output, means for applying the output of said full wave rectifier to the signal input of said analogue gate and to one of the inputs of said differential amplifier, means for applying the first series of timing pulses to the timing input of said analogue gate, means for applying the output of said analogue gate to said potential storage means, means for applying said stored potential from said storage means to the other input of said differential amplifier, means for applying the two outputs of said differential amplifier respectively to the set and reset input terminals of said third flip-flop circuit, and said second series of timing pulses to the timing input of said third flip-flop circuit, whereby when the last half of a bit interval exhibits higher amplitude than the first half of the next consecutive bit interval, said one output of said third flip-flop provides a higher signal output level than the zero output thereof, and when the last half of a bit interval exhibits lower amplitude than the amplitude of the first half of the next consecutive bit interval said zero output of said third flip-flop provides a higher signal output level than said one output thereof, means responsive to the concurrent occurrence of an error pulse and a higher signal output level from said zero output of said third flip-flop to reverse the state of said second flip-flop, means responsive to the concurrent occurrence of an error pulse and a higher signal output level from said one output of said third flip-flop to reverse the state of said first flip-flop, whereby errors in said signal wave are corrected.

7. An error correcting circuit for a diphase modulated signal wave in which a wave is reversed in phase at the middle of a complete cycle thereof corresponding to a bit interval to indicate a mark in which said wave continues throughout a complete cycle corresponding to another bit interval without phase reversal of the wave to indicate a space, whereby in the absence of an error, the last half of a bit interval and the first half of the next adjacent bit interval are of opposite polarity comprising a full wave rectifier, a slicer, means for applying said signal wave after transmission to said full wave rectifier and to said slicer, timing and pulse generating means, means for applying the output of said slicer to said timing and generating means, said timing and pulse generating means producing a first and a second series of timing pulses each at the frequency of the said diphase modulating wave, the timing pulses of said first series being equally spaced in time from the timing pulses of said second series, means for producing a series of delayed timing pulses, said delayed pulses occurring after pulses of said second series of timing pulses and before pulses of said first series of said timing pulses, an inverter, first and second flip-flop circuits each having two stable states and a set, a reset and a timing input and a one and a zero output, means for applying the output of said slicer to the set input of said first flip-flop circuit and to the reset input of said first flip-flop circuit through said inverter, means for applying the one and the zero outputs of said first flip-flop to the set and reset inputs respectively of said second flip-flop, said first flip-flop circuit delaying said signal wave applied thereto from said slicer and said second flip-flop circuit delaying the input thereto from said first flip-flop circuit a time equal to one half a bit interval, means for applying said first and second series of timing pulses to the timing inputs of said first and second flip-flop circuits, a first and a second And circuit each having three inputs, means for applying the one output of said first and second flip-flop circuits to the first and second inputs respectively of the first of said And circuits, means for applying the zero output of said first and second flip-flop circuits to the first and second inputs respectively of the second of said And circuits, means for applying said series of delayed timing pulses to the third inputs of said first and second And circuits, an error pulse appearing at the output of said first and second And circuits in response to the occurrence of like polarity of input voltages on the first and second inputs of said And circuits at the time of occurrence of a delayed timing pulse, an analogue gate circuit having a signal and a timing input and an output, a potential storage means, a differential amplifier having two inputs and two outputs, the voltages at the outputs indicating which input voltage is greater, a third flip-flop circuit having two stable states and a set, a reset and a timing input and a one and a zero output, means for applying the output of said full wave rectifier to the signal input of said analogue gate and to one of the inputs of said differential amplifier, means for applying the first series of timing pulses to the timing input of said analogue gate, means for applying the output of said analogue gate to said potential storage means, means for applying said stored potential from said storage means to the other input of said differential amplifier, means for applying the two outputs of said differential amplifier respectively to the set and reset input terminals of said third flip-flop circuit, and said second series of timing pulses to the timing input of said third flip-flop circuit, whereby, when the last half of a bit interval exhibits higher voltage amplitude than the first half of the next consecutive bit interval, said one output of said third flip-flop provides a higher voltage level than the zero output thereof, and when the last half of a bit interval exhibits lower voltage amplitude than the voltage of the first half of the next consecutive bit interval said zero output of said third flip-flop provides a higher voltage level than said one output thereof, means responsive to the concurrent occurrence of an error pulse and a higher voltage from said zero output of said third flip-flop to reverse the state of said second flip-flop, and means responsive to the concurrent occurrence of an error pulse and a higher voltage on said one output of said third flip-flop to reverse the state of said first flip-flop, whereby errors in said received diphase signal wave are corrected.

8. An error correcting circuit for a diphase modulated signal wave in which a wave is reversed in phase at the middle of a complete cycle thereof corresponding to a bit interval to indicate a mark and in which said wave continues throughout a complete cycle corresponding to another bit interval without phase reversal of the wave to indicate a space, whereby in the absence of an error, the last half of a bit interval and the first half of the next adjacent bit interval are of opposite polarity comprising a full wave rectifier, a slicer, means for applying said signal wave after transmission to said full wave rectifier and to said slicer, timing and pulse generating means, means for applying the output of said slicer to said timing and generating means, said timing and pulse generating means producing a first and a second series of timing pulses each at the frequency of the said diphase modulating wave, the timing pulses of said first series being equally spaced in time from the timing pulses of said second series, means for producing a first series of delayed timing pulses and a second series of further delayed timing pulses, said first and second series of delayed pulse occurring after pulses of said second series of timing pulses and before pulses of said first series of said timing pulses, an inverter, first, second and third flip-flop circuits each having two stable states and a set, a reset and a timing input and a one and a zero output, means for applying the output of said slicer to the set input of said first flip-flop circuit and to the reset input of said first flip-flop circuit through said inverter, means for applying the one and the zero outputs of said first flip-flop to the set and reset inputs respectively of said second flip-flop means for applying the one and zero outputs of said second flip-flop to the set and reset inputs respectively of said third flip-flop, said second and third flip-flop circuits each delaying the waves applied thereto by a half of a bit interval, means for applying said first and second series of timing pulses to the timing inputs of said first, second and third flip-flop circuits.

a first and a second And circuit each having three inputs, means for applying the one output of said first and second flip-flop circuits to the first and second inputs respectively of the first of said And circuits, means for applying the zero output of said first and second flip-flop circuits to tthe first and second inputs respectively of the second of said And circuits, means for applying said first series of delayed timing pulses to the third input of said first and second And circuits, an error pulse appearing at the output of said first and second And circuits in response to the occurrence of like polarity of input voltages on the first and second inputs of said And circuits at the time of occurrence of a first delayed timing pulse, an analogue gate circuit having a signal and a timing input and an output, a potential storage means, a differential amplifier having two inputs and two outputs, the voltages at the outputs indicating which input voltage is greater, a fourth flip-flop circuit having two stable states and a set, a reset and a timing input and a one and a zero output, means for applying the output of said full wave rectifier to the signal input of said analogue gate and to one of the inputs of said differential amplifier, means for applying the first series of timing pulses to the timing input of said analogue gate, means for applying the output of said analogue gate to said potential storage means, means for applying said stored potential from said storage means to the other input of said differential amplifier, means for applying the two outputs of said differential amplifier respectively to the set and reset input terminals of said fourth flip-flop circuit, and the second series of timing pulses to the timing input of said fourth flip-flop circuit, whereby, when the last half of a bit interval exhibits higher voltage amplitude than the first half of the next consecutive bit interval, said one output of said fourth flip-flop provides a higher voltage than the zero output thereof, and when the last half of a bit interval exhibits lower voltage amplitude than the voltage of the first half of the next consecutive bit interval said zero output of said fourth flip-flop provides a higher voltage than said one output thereof, means responsive to the concurrent occurrence of an error pulse and a higher voltage on said zero output of said fourth flip-flop to reverse the state of said second flpi-flop, means responsive to the concurrent occurrence of an error pulse and a higher voltage on said one output of said fourth flip-flop to reverse the state of said flip-flop, whereby errors in said diphase signal wave are corrected before application thereof to said third flip-flop, a third and a fourth And circuit each having three inputs, means for applying the one output of said second and third flip-flop respectively to two inputs of said third And circuit, means for applying the zero output of said second and third flip-flops respectively to two inputs of said fourth And circuit, and means for applying said second series of further delayed tuning pulses to the third input of said third and fourth And circuits, means for combining into a single signal the outputs of said third and fourth And circuits, said third and fourth And circuits and said last mentioned means being operated in a manner to demodulate said corrected diphase signal wave.

References Cited

UNITED STATES PATENTS

| | | | |
|---|---|---|---|
| 3,244,986 | 4/1966 | Rumble | 178—88 X |
| 3,331,051 | 7/1967 | Simon | 178—68 |

ROBERT L. GRIFFIN, *Primary Examiner.*

W. S. FROMMER, *Assistant Examiner.*

U.S. Cl. X.R.

178—67; 340—146.1